UNITED STATES PATENT OFFICE.

JAMES W. GRIFFES, OF HANFORD, CALIFORNIA.

CONDITION POWDER.

SPECIFICATION forming part of Letters Patent No. 364,408, dated June 7, 1887.

Application filed September 29, 1886. Serial No. 214,895. (No specimens.)

*To all whom it may concern:*

Be it known that I, JAMES W. GRIFFES, a citizen of the United States, residing at Hanford, Tulare county, State of California, have invented a new and useful composition of matter to be used in veterinary practice as a Condition Powder, of which the following is a specification.

My composition consists of the following ingredients, combined in substantially the proportions stated, viz: tamarack bark, (*Tamarix gallica*,) ten parts; wild cherry, black, (*Cerasus virginiana*,) six parts; spikenard-root, (*Auralia racemosa*,) four parts; boneset, (*Eupatorium perfoliatum*,) four parts; dandelion-root, (*Leontodon taraxacum*,) four parts; mandrake-root, (*Mandragora officinarum*) one part; wild-turnip root, (*Brassica rapa*,) four parts; ginseng-root, (*Panax quinquefolium*,) two-thirds of one part. These ingredients are first well mixed and then ground to a powder. It is to be used in veterinary practice for the treatment of all blood diseases, and is given in doses of one table-spoonful, twice a day, morning and evening, mixed with the feed.

In cases where quick action is required a quantity of the compound may be steeped and the animal drenched with it.

Having thus described my invention, what I claim as new, and desire to secure by Letters Patent, is—

The herein-described composition of matter to be used in veterinary practice as a condition powder, consisting of tamarack bark, wild cherry, spikenard-root, boneset, dandelion-root, mandrake-root, wild-turnip root, and ginseng-root, substantially in the proportions specified.

In witness whereof I have hereunto set my hand.

JAMES W. GRIFFES.

Witnesses:
FRANCIS A. BLAKELEY,
W. P. McCORD.